(12) United States Patent
Kirk et al.

(10) Patent No.: US 7,244,292 B2
(45) Date of Patent: Jul. 17, 2007

(54) ELECTRET ARTICLE HAVING HETEROATOMS AND LOW FLUOROSATURATION RATIO

(75) Inventors: Seth M. Kirk, Minneapolis, MN (US); Gerald R. Spartz, St. Paul, MN (US); Marvin E. Jones, Grant, MN (US); Steven J. Pachuta, Eagan, MN (US); John S. Huberty, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 152 days.

(21) Appl. No.: 11/120,049

(22) Filed: May 2, 2005

(65) Prior Publication Data

US 2006/0243139 A1    Nov. 2, 2006

(51) Int. Cl.
*B03C 3/28* (2006.01)
(52) U.S. Cl. .................. 96/69; 55/528; 55/DIG. 33; 55/DIG. 35; 55/DIG. 39; 95/59; 307/400; 442/82; 442/88
(58) Field of Classification Search .............. 96/66–69; 95/59; 55/527, 528, DIG. 33, DIG. 39, DIG. 35; 307/400; 442/82, 88, 92, 94, 98
See application file for complete search history.

(56) References Cited

U.S. PATENT DOCUMENTS

| | | | |
|---|---|---|---|
| 4,215,682 A | 8/1980 | Kubik et al. | |
| 4,264,750 A | 4/1981 | Anand et al. | |
| RE30,782 E | 10/1981 | van Turnhout | |
| 4,508,781 A | 4/1985 | Yagi et al. | |
| 4,557,945 A | 12/1985 | Yagi et al. | |
| RE32,171 E | 6/1986 | van Turnhout | |
| 4,592,815 A | 6/1986 | Nakao | |
| 5,025,052 A | 6/1991 | Crater et al. | |
| 5,099,026 A | 3/1992 | Crater et al. | |
| 5,411,576 A | 5/1995 | Jones et al. | |
| 5,472,481 A | 12/1995 | Jones et al. | |
| 5,496,507 A | 3/1996 | Angadjivand et al. | |
| 5,908,598 A | 6/1999 | Rousseau et al. | |
| 6,119,691 A | 9/2000 | Angadjivand et al. | |
| 6,213,122 B1 | 4/2001 | Rousseau et al. | |
| 6,214,094 B1 | 4/2001 | Rousseau et al. | |
| 6,238,466 B1 | 5/2001 | Rousseau et al. | |
| 6,375,886 B1 | 4/2002 | Angadjivand et al. | |
| 6,397,458 B1 | 6/2002 | Jones et al. | |
| 6,398,847 B1 | 6/2002 | Jones et al. | |
| 6,406,657 B1 | 6/2002 | Eitzman et al. | |

(Continued)

FOREIGN PATENT DOCUMENTS

JP    1-232038 A  *  9/1989

(Continued)

OTHER PUBLICATIONS

Sessler, G.M., *Electrets*, v. 1, pp. 374-381 (1998).

*Primary Examiner*—Richard L. Chiesa
(74) *Attorney, Agent, or Firm*—Karl G. Hanson

(57) ABSTRACT

An electret article that includes a polymeric material that has electric charge imparted thereto, that has one or more heteroatoms, that has a fluorosaturation ratio of less than 200, and that has an atomic percent fluorine of greater than about 40%. The inventive electret article is resistant to charge degradation upon exposure to high temperatures for prolonged time periods.

36 Claims, 3 Drawing Sheets

U.S. PATENT DOCUMENTS

| | | |
|---|---|---|
| 6,409,806 B1 | 6/2002 | Jones et al. |
| 6,419,871 B1 | 7/2002 | Ogale |
| 6,432,175 B1 | 8/2002 | Jones et al. |
| 6,454,986 B1 | 9/2002 | Eitzman et al. |
| 6,524,488 B1 | 2/2003 | Insley et al. |
| 6,562,112 B2 | 5/2003 | Jones et al. |
| 6,660,210 B2 | 12/2003 | Jones et al. |
| 6,743,464 B1 | 6/2004 | Insley et al. |
| 6,783,574 B1 | 8/2004 | Angadjivand et al. |
| 6,808,551 B2 | 10/2004 | Jones et al. |
| 6,827,764 B2 * | 12/2004 | Springett et al. .............. 96/66 |
| 2002/0174869 A1 | 11/2002 | Gahan et al. |
| 2003/0054716 A1 | 3/2003 | Chou et al. |
| 2003/0134515 A1 | 7/2003 | David et al. |
| 2003/0177908 A1 | 9/2003 | Jones et al. |
| 2004/0207125 A1 * | 10/2004 | Jones et al. ................. 264/423 |
| 2006/0243138 A1 * | 11/2006 | Spartz et al. .................. 96/69 |
| 2006/0243139 A1 * | 11/2006 | Kirk et al. ..................... 96/69 |

FOREIGN PATENT DOCUMENTS

| | | |
|---|---|---|
| WO | WO 00/01737 | 1/2000 |
| WO | WO 01/07144 A2 | 2/2001 |
| WO | WO 01/91909 A1 | 12/2001 |

* cited by examiner

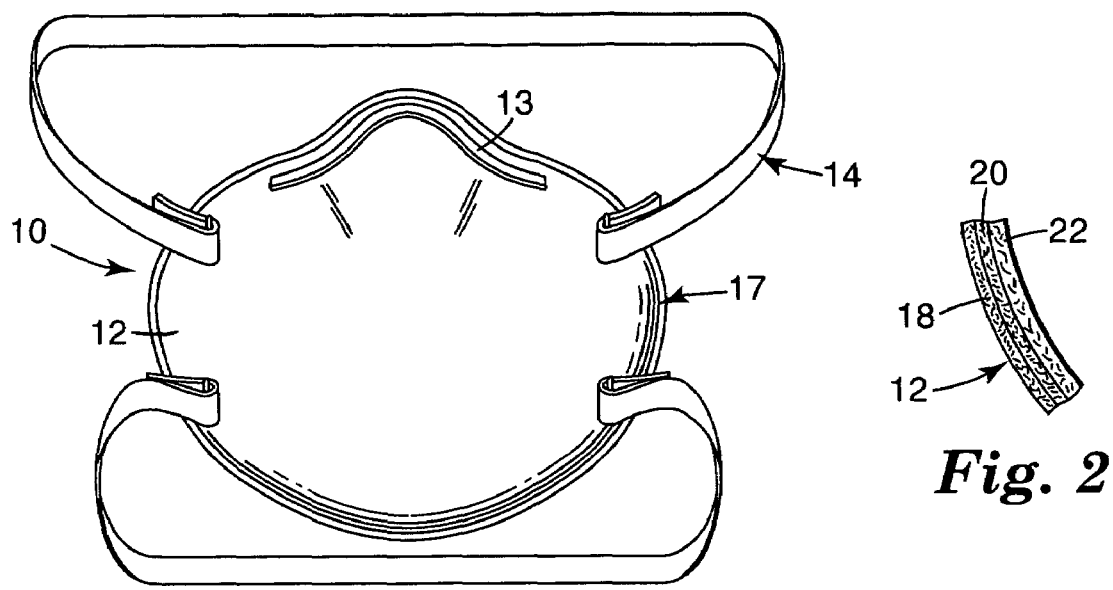
Fig. 1
Fig. 2
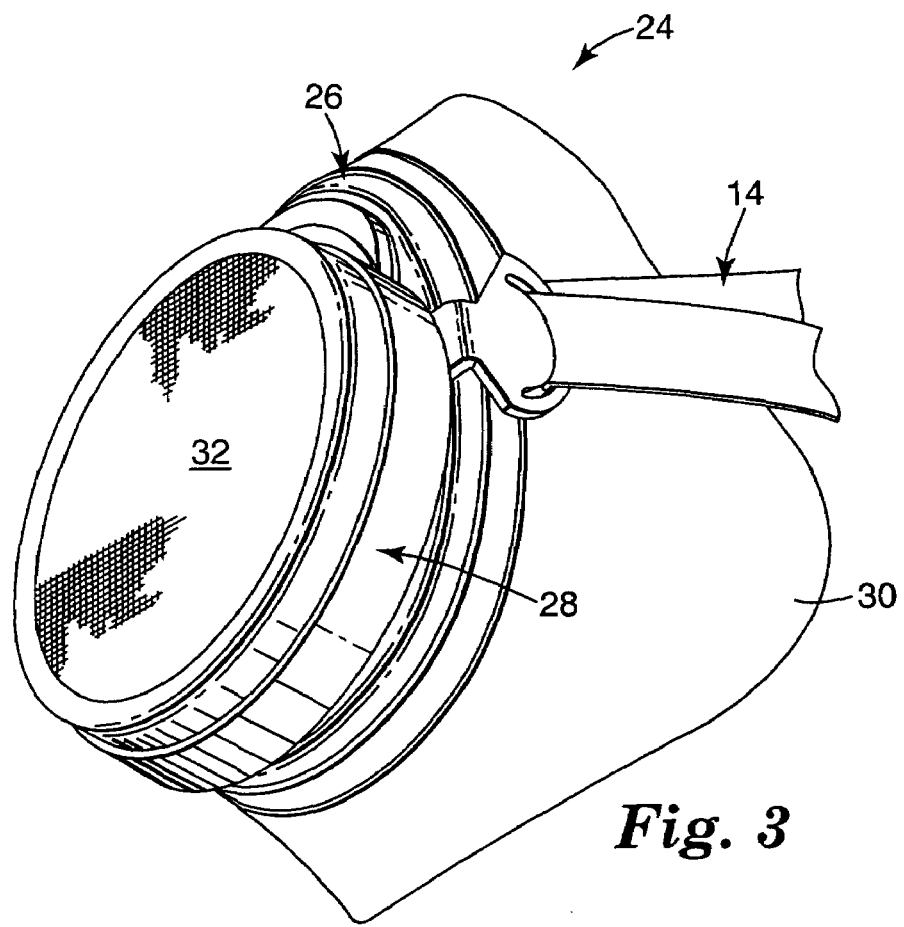
Fig. 3

ELECTRET ARTICLE HAVING HETEROATOMS AND LOW FLUOROSATURATION RATIO

The present invention pertains to an electret article that includes a polymeric material that has electric charge imparted thereto, that includes one or more types of heteroatoms, that has a fluorosaturation ratio of about 200 or less, and that has an atomic percent fluorine of about 40% or greater. The inventive electret article is resistant to charge degradation upon exposure to high temperatures for prolonged time periods.

BACKGROUND

Electret articles—that is, dielectric articles that exhibit at least quasi-permanent electric charge—are known to exhibit good filtration properties. The articles have been fashioned in a variety of constructions, but for air filtration purposes, the articles commonly take the form of a nonwoven polymeric fibrous web. An example of such a product is the Filtrete™ brand furnace filter sold by the 3M Company. Nonwoven polymeric electret filters also are used in personal respiratory protection devices—see, for example, U.S. Pat. No. 5,307,796 to Kronzer et al., U.S. Pat. No. 5,804,295 to Braun et al., and U.S. Pat. No. 6,216,693 to Rekow et al.

A variety of methods have been used to make electrets, including fiber/electric particle bombardment (U.S. Pat. No. 4,215,682 to Kubik et al.), direct current "DC" corona charging (see, U.S. Pats. No. Re. 30,782 and 32,171 to van Turnhout and U.S. Pat. No. 4,592,815 to Nakao), hydrocharging (see, U.S. Pat. Nos. 5,496,507, 6,119,691, 6,375,886, and 6,783,574 to Angadjivand et al., U.S. Pat. No. 6,406,657 to Eitzman et al., and U.S. Pat. No. 6,743,464 to Insley et al.), and from exposure to polar liquids (U.S. Pat. No. 6,454,986 to Eitzman et al.). The electric charge that is imparted to the dielectric article is effective in enhancing particle capture.

In addition to fibrous structures, microstructured or microchanneled filter media have been electrically charged to improve the filtration performance (see, for example, U.S. Pat. No. 6,524,488 to Insley et al.).

During use, electret filters frequently become loaded with particles and contaminants that interfere with the filtering capabilities of the electret filter. Liquid aerosols, for example, particularly oily aerosols, may cause electret filters to lose their electret-enhanced filtering efficiency (see, U.S. Pat. No. 6,627,563 to Huberty).

Numerous methods have been developed to counter this filtering efficiency loss. One method includes adding additional layers of nonwoven polymeric web to the filter. This approach, however, can increase the pressure drop across the electret filter and can add to its weight and bulk. When the electret filter is used in a personal respiratory protection device, these drawbacks can be particularly troublesome. Increased pressure drop, for example, results in increased breathing resistance, making the respirator more uncomfortable to wear. Another method for improving resistance to oily-mist aerosols, includes adding a melt processable fluorochemical additive such as a fluorochemical oxazolidinone, a fluorochemical piperazine, or a perfluorinated alkane to the polymer during the creation of the polymeric fibrous article—see, for example, U.S. Pat. Nos. 5,025,052 and 5,099,026 to Crater et al. and U.S. Pat. Nos. 5,411,576 and 5,472,481 to Jones et al. The fluorochemicals are melt processable, that is they suffer substantially no degradation under the melt processing conditions that are used to form the fibers in the electret web—see also U.S. Pat. No. 5,908,598 to Rousseau et al. In addition to a melt-processing method, fluorinated electrets also have been made by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. The plasma fluorination process causes fluorine atoms to become present on the surface of the polymeric article. The fluorinated polymeric article may be electrically charged using, for example, the hydrocharging techniques mentioned above. The plasma fluorination process is described in a number of U.S. Pat. Nos. 6,397,458, 6,398,847, 6,409,806, 6,432,175, 6,562,112, 6,660,210, and 6,808,551 to Jones/Lyons et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

Although fluorinated electrets are suitable for many filtration applications, some filters require enhanced thermal stability to meet product specifications, for example, military specifications and NIOSH requirements—see NIOSH, Statement of Standard for Chemical, Biological, Radiological, and Nuclear (CBRN) Air-Purifying Escape Respirator, Attachment A, Sep. 30, 2003 and NIOSH, Statement of Standard for Chemical, Biological, Radiological, and Nuclear (CBRN) Full Facepiece Air Purifying Respirator (APR), Appendix A, Apr. 4, 2003. Applications exist where the electret filter media should be resistant to charge degradations at high temperatures for prolonged periods. The present invention described below addresses this need and accordingly provides an electret article that has good oily mist filtration properties despite being exposed to high temperatures for extended time periods.

SUMMARY OF THE INVENTION

The present invention provides a new fluorinated polymeric article, which article comprises a polymeric material that has electric charge imparted thereto, that includes one or more types of heteroatoms, that has a fluorosaturation ratio of less than 200, and that has an atomic percent fluorine of about 40% or greater. The inventive electret article differs from known fluorinated electret articles in that it has one or more types of heteroatoms, a fluorosaturation ratio of about 200 or less, and an atomic percent fluorine of greater than about 40%. The inventors discovered that a polymeric electret article that has such features can exhibit improved filtration performance under stressed thermal conditions.

The present invention also provides a new method of making a fluorinated electret article, which method comprises: (a) fluorinating a nonconductive polymeric article in a plasma generated in a controlled atmosphere that contains a fluorine-containing species and a nitrogen-containing species, the fluorination occurring at a pressure less than atmospheric; and (b) imparting a persistent electric charge to the polymeric article. The inventive method differs from known methods of making fluorinated electret articles in that the fluorination step occurs in a plasma in the presence of a nitrogen-containing species and at a pressure less than atmospheric. Applicants discovered that electret articles made according to the present invention can have different surface chemistry, which chemistry can provide beneficial performance characteristics.

The filtering performance of an electret article is commonly characterized using a parameter that is referred to in the art as "quality factor" or "Q value". The Q value characterizes filtration performance as a blend of the particle penetration and pressure drop parameters. As indicated above, some filters require enhanced thermal stability to meet filtration product specifications. Applications exist where the electret filter media should be resistant to charge degradation at high temperatures. Applicants demonstrate that extraordinary quality factor data can be maintained when testing the inventive electret articles after an accelerated high-temperature aging exposure. Specifically, applicants have shown that the inventive electret articles can provide extraordinary quality factors after 9 hours of aging at 100° C. The Q value that results from this test is referred to as "Q9". The inventive electret articles can maintain good filtration efficiency despite being "aged" at high temperatures for an extended time period.

These and other features or advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

GLOSSARY

The terms set forth below will have the meanings as defined:

"aerosol" means a gas that contains suspended particles in solid or liquid form;

"atomic percent fluorine" means the amount of fluorine determined according to the Method for Determining Surface Concentration of Fluorine Using X-Ray Photoelectron Spectroscopy (XPS);

"background value" means the point below which a spectroscopic signal can no longer be distinguished from the noise in the system (for all heteroatoms other than nitrogen; for nitrogen the background value is 0.0040);

"contaminants" mean particles and/or other substances that generally may not be considered to be particles but may be harmful to breathe (e.g., organic vapors);

"dielectric" means nonconductive to direct electric current;

"electret" means a dielectric article that exhibits at least quasi-permanent electric charge;

"electric charge" means that there is charge separation;

"fibrous" means possessing fibers and possibly other ingredients;

"fibrous electret web" refers to a woven or nonwoven web that contains fibers and that possesses at least quasi-permanent electric charge;

"fluorinating" means placing fluorine atoms on the surface of an article;

"fluorine-containing species" means molecules and moieties containing fluorine atoms including, e.g., fluorine atoms, elemental fluorine, and fluorine containing radicals;

"heteroatom" means any atom other than carbon, hydrogen, or oxygen, which atom is reactive with fluorine to form a stable bond and includes but is not limited to P, N, B, Si, and S (the heteroatom is considered to be present in the polymeric material if it is above the "background value" as set forth below in "Heteroatom Determinations");

"nonconductive" means possessing a volume resistivity greater than about $10^{14}$ ohm·cm at room temperature (22° C.);

"nonwoven" means a structure or portion of a structure in which the fibers or other structural components are held together by a means other than weaving;

"persistent electric charge" means that the electric charge resides in the electret article for at least the commonly-accepted useful life of the product in which the electret article is employed;

"plasma" means a state of matter in which molecules or atoms are effectively ionized allowing charges to flow freely;

"polymer" means an organic material that contains repeating linked molecular units or groups that are regularly or irregularly arranged;

"polymeric" means containing a polymer and possibly other ingredients;

"polymeric fiber-forming material" means a composition that contains a polymer, or that contains monomers capable of producing a polymer, and possibly contains other ingredients, and that is capable of being formed into solid fibers;

"quasi-permanent" means that the electric charge resides in the article under ambient atmospheric conditions (22° C., 101,300 Pascals (Pa) atmospheric pressure, and 50% humidity) for a time period long enough to be significantly measurable;

"staple fiber" refers to fibers that are cut to a generally defined length, typically about 2 centimeters to about 25 centimeters and typically have fiber diameter of at least 15 micrometers;

"surface fluorination" means the presence of fluorine atoms on a surface (e.g., the surface of a polymeric article);

"surface modified" means that the chemical structure at the surface has been altered from its original state;

"thermoplastic" means a polymeric material that softens when exposed to heat and that hardens again when cooled without undergoing appreciable chemical change; and "web" means a structure that is significantly larger in two dimensions than in a third and that is air permeable.

BRIEF DESCRIPTION OF THE DRAWINGS

FIG. 1 is a perspective view of a disposable respiratory mask 10 that may use electret filter media of the present invention;

FIG. 2 is a cross-sectional view of the body 12 of the respiratory mask 10 shown in FIG. 1, showing a fibrous electret filter layer 20;

FIG. 3 is a perspective view of a respiratory mask 24 that has a filter cartridge 28 that may include electret filter media of the present invention;

DETAILED DESCRIPTION OF THE PREFERRED EMBODIMENTS

Figure 4:
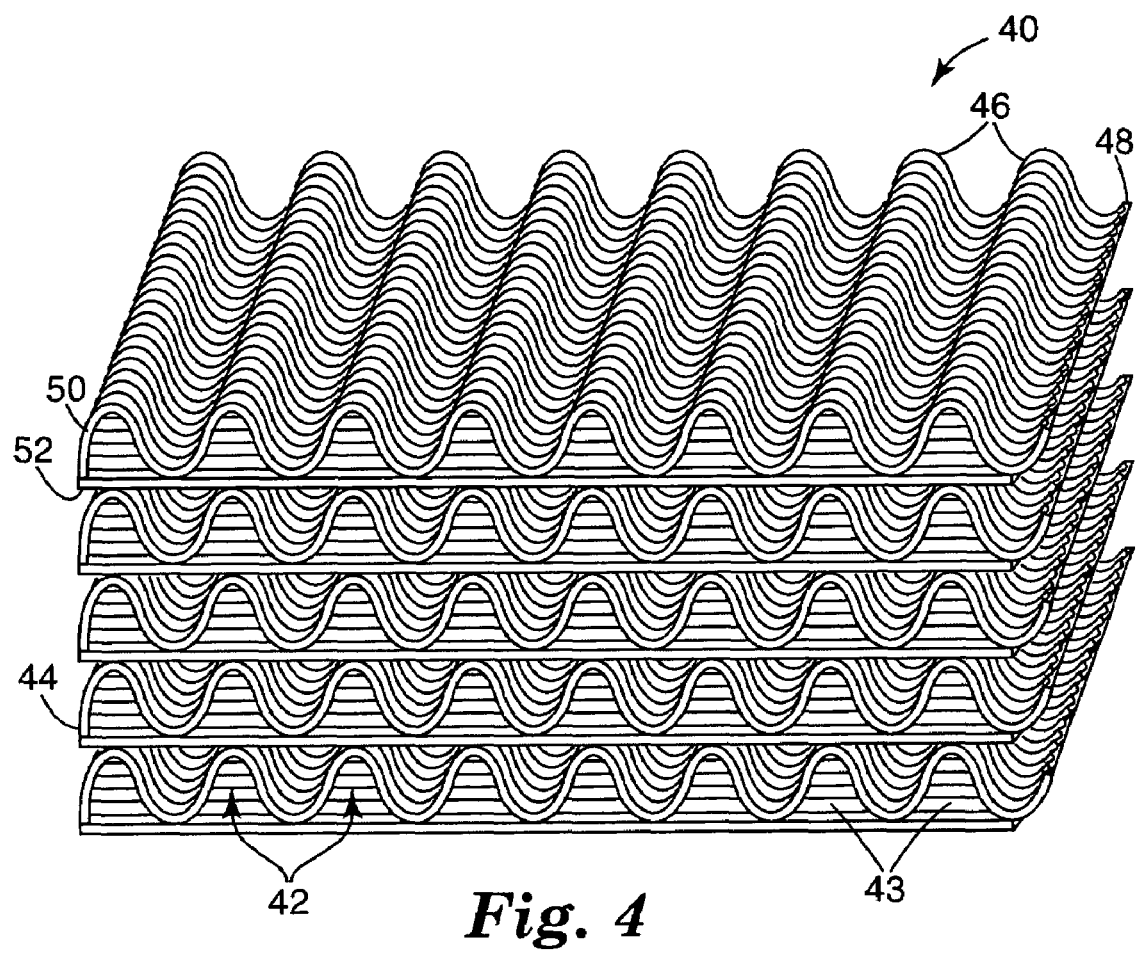
FIG. 4 is an illustration of a non-fibrous electret article 40 of the present invention.

In describing preferred embodiments of the invention, specific terminology is used for the sake of clarity. The invention, however, is not intended to be limited to the specific terms so selected, and it is to be understood that each term so selected includes all technical equivalents that operate similarly.

Webs suitable for use in this invention can be made from a variety of techniques, including air laid processes, wet laid processes, hydro-entanglement, spun-bond processes and melt blown processes such as described in Van A. Wente, *Superfine Thermoplastic Fibers*, 48 INDUS. ENGN. CHEM. 1342-46 and in Report No. 4364 of the Naval Research Laboratories, published May 25, 1954, entitled *Manufacture of Super Fine Organic Fibers* by Van A. Wente et al. Webs made using combinations of these techniques and from combinations of such fibers may be used as well. Microfibers, particularly meltblown microfibers, are particularly suitable for use in fibrous webs that are used as filters. As used in this document, "microfiber" means fiber(s) that have an effective diameter of about 25 micrometers or less. Effective fiber diameter can be calculated using equation number 12 in Davies, C. N., *The Separation of Airborne Dust and Particles*, INST. MECH. ENGN., LONDON PROC. 1B (1952). For filtering applications, the microfibers typically have an effective fiber diameter of less than 20 micrometers, more typically, about 1 to about 10 micrometers. Fibers made from fibrillated films may also be used—see, for example, U.S. Pat. Nos. Re. 30,782, 32,171, U.S. Pat. Nos. 3,998,916 and 4,178,157 to Van Turnout.

Staple fibers also may be combined with the microfibers to improve web loft, that is, to reduce its density. Reducing web density can lower the pressure drop across the web, making it easier for air to pass through the filter. Lower pressure drops are particularly desirable in personal respiratory protection devices because they make the respirator more comfortable to wear. When the pressure drop is lower, less energy is needed to draw air through the filter. A respirator wearer who dons a negative pressure mask—that is a respirator that requires negative pressure from the wearer's lungs to draw air through the filter—thus does not have to work as hard to breath filtered air. Lower energy requirements also can be beneficial in powered filtering systems to reduce costs associated with powering the fan and to extend the service life of a battery in a battery powered system. In a typical nonwoven fibrous filter, no more than about 90 weight percent staple fibers are present, more typically no more than about 70 weight percent. Typically, the remainder of the fibers are microfibers. Examples of webs that contain staple fibers are disclosed in U.S. Pat. No. 4,118,531 to Hauser.

Active particulate also may be included in the electret webs for various purposes, including sorbent purposes, catalytic purposes, and others. U.S. Pat. No. 5,696,199 to Senkus et al., for example, describes various types of active particulate that may be suitable. Active particulate that has sorptive properties—such as activated carbon or alumina—may be included in the web to remove organic vapors during filtration operations. The active particulate may be present in the web at amounts up to about 95 volume percent. Examples of particle-loaded nonwoven webs are described, for example, in U.S. Pat. No. 3,971,373 to Braun, U.S. Pat. No. 4,100,324 to Anderson, and U.S. Pat. No. 4,429,001 to Kolpin et al.

Polymers that may be suitable for use in producing electret articles include thermoplastic organic nonconductive polymers. These polymers are generally capable of retaining a high quantity of trapped charge and are capable of being processed into fibers, such as through a melt-blowing apparatus or a spun-bonding apparatus. The term "organic" means that the backbone of the polymer includes carbon atoms. Preferred polymers include polyolefins, such as polypropylene, poly-4-methyl-1-pentene, blends or copolymers containing one or more of these polymers, and combinations of these polymers. Other polymers may include polyethylene, other polyolefins, polyvinylchlorides, polystyrenes, polycarbonates, polyethylene terephthalate, other polyesters, and combinations of these polymers and optionally other nonconductive polymers may be used as polymeric fiber-forming material or for producing other electret articles.

The polymeric electret articles, particularly fibers, also may be extruded or otherwise formed to have multiple polymer components—see U.S. Pat. No. 4,729,371 to Krueger and Dyrud and U.S. Pat. Nos. 4,795,668, and 4,547,420 to Krueger and Meyer. The different polymer components may be arranged concentrically or longitudinally along the length of the fiber to create, for example, a bicomponent fiber. The fibers may be arranged to form a "macroscopically homogeneous" web, namely, a web that is made from fibers that each have the same general composition.

Fibers may be made from these polymers in conjunction with other suitable additives. Possible additives are thermally stable organic triazine compounds or oligomers, which compounds or oligomers contain at least one nitrogen atom in addition to those in the triazine ring—see U.S. Pat. Nos. 6,268,495, 5,976,208, 5,968,635, 5,919,847, and 5,908,598 to Rousseau et al. Another additive known to enhance electrets charged by jets of water is Chimassorb™ 944 LF (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from Ciba-Geigy Corp.

The fibers used in the invention do not need to contain ionomers—particularly metal ion neutralized copolymers of ethylene and acrylic or methacrylic acid or both—to produce a fibrous product suitable for filtration applications. Nonwoven fibrous electret webs can be suitably produced from the polymers described above without containing 5 to 25 weight percent (meth)acrylic acid with acid groups partially neutralized with metal ions.

Fibers that contain additives can be quenched after shaping a heated molten blend of the polymer and additive—followed by annealing and charging steps—to create an electret article. Enhanced filtration performance may be imparted to the article by making the electret in this manner—see U.S. Pat. No. 6,068,799 to Rousseau et al. The electret articles also can be made to have a low level of extractable hydrocarbon (<3.0 weight %) to improve loading performance—see U.S. Pat. No. 6,776,951 to Rousseau et al.

The polymeric material that is used to produce an electret article according to the invention preferably has a volume resistivity of $10^{14}$ ohm·cm or greater at room temperature. More preferably, the volume resistivity is about $10^{16}$ ohm·cm or greater. Resistivity of the polymeric fiber-forming material can be measured according to standardized test ASTM D 257-93. The polymeric fiber-forming material used to make electret articles such as the melt blown fibers also should be substantially free from components such as antistatic agents, which agents could increase the electrical conductivity or otherwise interfere with the ability of the electret article to accept and hold electrostatic charges.

Electrets that comprise nonwoven polymeric fibrous webs for respiratory filters typically have a "basis weight" in the range of about 2 to 500 grams per square meter (g/m$^2$), more typically about 20 to 150 g/m$^2$. The basis weight is the mass per unit area of filter web. The thickness of such nonwoven polymeric fibrous web is typically about 0.25 to 20 millimeters (mm), more preferably about 0.5 to 2 mm. Multiple layers of fibrous electret webs are commonly used in filter elements. The solidity of the fibrous electret web typically is about 1 to 25, more typically about 3 to 10.

The inventive electret articles may be used as filters in filtering masks that are adapted to cover at least the nose and mouth of a wearer.

FIG. 1 illustrates an example of a filtering face mask 10 that may be constructed to contain an electrically-charged nonwoven web that is produced according to the present invention. The generally cup-shaped body portion 12 is adapted to fit over the nose and mouth of the wearer. The body portion 12 is porous so that inhaled air can pass through it. The electret filter media is disposed in the mask body 12 (typically over substantially the whole surface area) to remove contaminants from the inhaled air. A conformable nose clip 13 may be placed on the mask body to assist in maintaining a snug fit over the wearer's nose. The nose clip can be an "M-shaped" clip as described in U.S. Pat. Des. No. 412,573 and 5,558,089 to Castiglione. A strap or harness system 14 may be provided to support the mask body 12 on the wearer's face. Although a dual strap system is illustrated in FIG. 1, the harness 14 may employ only one strap 16, and it may come in a variety of other configurations—see, for example, U.S. Pat. No. 4,827,924 to Japuntich et al., U.S. Pat. No. 5,237,986 to Seppalla et al., and U.S. Pat. No. 5,464,010 to Byram. An exhalation valve can be mounted to the mask body to rapidly purge exhaled air from the mask interior—see U.S. Pat. Nos. 5,325,892, 5,509,436, 6,843, 248, and 6,854,463 to Japuntich et al.; see also U.S. Pat. No. Re. 37,974 to Bowers.

FIG. 2 illustrates an example of a cross-section of a mask body 12. Mask body 12 may have a plurality of layers, as indicated by numerals 18, 20, and 22. The electret filter media may be supported by other layers, such as shaping layers that are made from thermally bonded fibers, such as bicomponent fibers that have an outer thermoplastic component that enables the fibers to bond to other fibers at points of fiber intersection. Layer 18 can be an outer shaping layer, layer 20 may be a filtration layer, and layer 22 may be an inner shaping layer. Shaping layers 18 and 22 support filtration layer 20 and provide shape to mask body 12. Although the term "shaping layers" is used in this description, shaping layers also have other functions, which in the case of an outermost layer may even be a primary function, such as protection of the filtration layer and prefiltration of a gaseous stream. Also, although the term "layer" is used, one layer may in fact comprise several sublayers, assembled to obtain desired thickness or weight. In some embodiments only one, generally inner, shaping layer is included in a face mask, but shaping may be accomplished more durably and conveniently if two shaping layers are used, for example, one on each side of the filtration layer as shown in FIG. 2. Shaping layer examples are described in the following patents: U.S. Pat. No. 4,536,440 to Berg, U.S. Pat. No. 4,807,619 to Dyrud et al., U.S. Pat. No. 5,307,796 to Kronzer et al., U.S. Pat. No. 5,374,458 to Burgio, and U.S. Pat. No. 4,850,347 to Skov. Although the illustrated mask body shown in FIGS. 1 and 2 has a generally round, cup-shaped configuration, the mask body may have other shapes—see for example U.S. Pat. No. 4,883,547 to Japuntich.

FIG. 3 illustrates another respirator 24 that may use the inventive electret articles as a filter. Respirator 24 includes an elastomeric mask body 26 that has a filter cartridge 28 secured to it. Mask body 26 typically includes an elastomeric face piece 30 that conformably fits over the nose and mouth of a person. The filter cartridge 28 may contain the inventive electret filter media for capturing contaminants before they are inhaled by the wearer. The filter element may include the polymeric electret filter article of the invention by itself or in conjunction with a gaseous filter such as an activated carbon bed. A porous cover or screen 32 may be provided on the filter cartridge to protect the external surface of the filter element. Examples of other filter cartridges where the inventive electret filter media may be used are disclosed, for example, in a filter cartridge for a respirator, such as the filter cartridge disclosed in U.S. Pat. No. Re. 35,062 to Brostrom et al. or in U.S. Pat. No. 5,062,421 to Burns and Reischel. As shown in these patents, multiple filter cartridges may be used. The cartridges also may be removable and replaceable. In addition, the inventive filter media may be used in the filter cartridges of powered air purifying respirators (PAPRs). Examples of PAPRs are shown in U.S. Pat. No. 6,666,209 to Bennett et al. and U.S. Pat. No. 6,575,165 to Cook et al. Further, the inventive filter media can be used in filter cartridges for escape hoods—see U.S. Pat. Des. No. 480,476 to Martinson et al., and U.S. Pat. Nos. 6,302,103, 6,371,116, 6,701,925 to Resnick.

FIG. 4 shows a perspective view of a filtration media array 40. The structure of array 40 may comprise multiple flow channels 42 that have inlets 43 on a first side 44 of the array 40 and have outlets 46 on a second side of the array 48. The flow channels may be defined by a corrugated or microstructured layer 50 and a cap layer 52. The contoured layer 50 may be joined to the cap layer 52 at one or more peaks or valleys. By stacking multiple layers of structured and planar members, a microchanneled arrangement may be achieved. The flow channels tend to have a high aspect ratio, and the film layers are preferably electrically charged to provide the article 40 with good capture efficiency. The pressure drop across the array 40 from first side 44 to second side 48 is negligible.

Non-fibrous electret articles that are used for filtration purposes thus may take the form of a shaped film, a microstructured surface, or a multitude of microstructured channels. Examples of non-fibrous electret articles are disclosed in U.S. Pat. No. 6,752,889 to Insley et al., U.S. Pat. No. 6,280,824 to Insley et al., U.S. Pat. No. 4,016,375 to Van Turnout, and U.S. Pat. No. 2,204,705 to Rutherford.

Fluorinating

The inventive fluorinated electrets can be prepared by transferring fluorine containing species from a gaseous phase to the article by chemical reaction, sorption, condensation, or other suitable means. The polymeric article can be fluorinated, optionally in the presence of a surface modifying electrical discharge, followed by charging the article to produce the fluorinated electret. Alternatively, the inventive articles can be charged first and then fluorinated.

The surface of the polymeric article can be modified to contain fluorine atoms by exposing the polymeric article to an atmosphere that includes fluorine containing species. The fluorination process can be performed at atmospheric pressure, but preferably is carried out at a pressure less than atmospheric, more preferably at a reduced pressure. "Reduced pressure" means pressure less than 700 Pascals (Pa). Preferably, the pressure is less than 140 Pa. The fluorination process is preferably performed in a controlled atmosphere to prevent contaminants from interfering with the addition of fluorine atoms to the surface of the article. The term "controlled" means the apparatus has the ability to control the composition of the atmosphere in the chamber where fluorination occurs. The atmosphere preferably is substantially free of oxygen and other undesired components. The atmosphere typically contains less than 1% oxygen or other undesired components, preferably less than 0.01%, by volume.

The fluorine containing species present in the atmosphere can be derived from fluorinated compounds that are gases at room temperature, that become gases when heated, or that are capable of being vaporized. Examples of useful sources of fluorine-containing species include fluorine atoms, elemental fluorine, fluorocarbons (e.g., $CF_4$, $C_3F_6$) inorganic fluorides such as fluorinated sulfur (e.g., $SF_6$), fluorinated nitrogen (e.g., $NF_3$), and $PF_3$, $BF_3$, $SiF_4$, hexafluoropropyleneoxide (HFPO), octafluorotetrahydrofuran (OFTHF), and combinations thereof. The atmosphere of fluorine containing species can also include inert diluent gases such as the noble gases helium, argon, etc, and combinations thereof. Nitrogen can also be used as a diluent.

The electrical discharge that is applied during the fluorination process is capable of modifying the surface chemistry of the polymeric article when applied in the presence of a source of fluorine containing species. The electrical discharge may be in the form of plasma, e.g., glow discharge plasma, corona plasma, silent discharge plasma (also referred to as dielectric barrier discharge plasma and alternating current ("AC") corona discharge), and hybrid plasma, e.g., glow discharge plasma at atmospheric pressure, and pseudo glow discharge—see U.S. Pat. Nos. 6,808,551, 6,660,210, 6,562,112, 6,432,175, 6,409,806, 6,398,847 and 6,397,458 to Jones/Lyons et al. Preferably, the plasma is an AC plasma at reduced pressure. Examples of useful surface modifying electrical discharge processes are described in U.S. Pat. Nos. 5,244,780, 4,828,871, and 4,844,979 to Strobel et al.

Another fluorination process may include immersing a polymeric article in a liquid that is inert with respect to elemental fluorine, and bubbling elemental fluorine gas through the liquid to produce a surface fluorinated article. Examples of useful liquids that are inert with respect to fluorine include perhalogenated liquids, e.g., perfluorinated liquids such as Performance Fluid PF 5052 (commercially available from the 3M Company). The elemental fluorine containing gas that is bubbled through the liquid can include an inert gas such as, e.g., nitrogen, argon, helium, and combinations thereof.

The higher the Q9 value, at a given flow rate, the better the filtering performance of the electret. Preferred electrets have a Q9 value of at least about 1.5/mmH$_2$O, preferably at least about 1.7/mmH$_2$O, more preferably at least about 2.0/mmH$_2$O. The Q9 value may be determined according to the test set forth below. Higher thermally stimulated discharge current (TSDC) values, which also correspond to higher thermal stability, may be achieved by this invention. Preferred electrets that contain polypropylene have a TSDC peak value of greater than 130° C., more preferably greater than 140° C.

The fluorine surface concentration may be ascertained using electron spectroscopy for chemical analysis (ESCA), also known as X-ray photoelectron spectroscopy or XPS. The surface of the inventive electret exhibits about 40 to about 65 atomic % fluorine when analyzed by XPS. XPS analyzes the elemental composition of the outermost surface (i.e., approximately 30 to 100 Å) of a specimen.

The electret also has a fluorosaturation ratio (FSR) at the surface of the electret of less than about 200, preferably less than about 180, and may be less than about 120. At the lower end, the FSR is typically greater than about 30 to 35. The fluorosaturation ratio, FSR, can be determined by dividing the atomic percent fluorine of a sample by its saturated/unsaturated ratio. The atomic percent fluorine and the saturated/unsaturated ratio may be determined using XPS and ToF-SIMS procedures described below.

To achieve the fluorosaturation ratio of the present invention, the electret articles preferably are prepared (fluorinated) in a system that is evacuated to a pressure below about 4 Pascals and is refilled with a continuous feed of the intended fluorinating atmosphere while controlling the pumping rate to achieve a desired working pressure. The inventors discovered that it is convenient to carry out the fluorination step under a reduced pressure using an AC powered discharge.

The heteroatom(s) are considered present in the electret article when detectable above their "background value". The heteroatoms preferably are present in the electret article at about 100% above the background value, more preferably about 500% above the background value, and still more preferably about 1000% above the background value. Preferred heteroatoms include S, N, B, and Si and combinations thereof. Other heteroatoms may include, for example, P, As, U, W Ti and Fe.

Imparting Electrical Charge

The electret charge can be imparted to the polymeric articles using various methods. Polymeric materials can be bombarded with electric particles when they are extruded from the die orifice as taught in U.S. Pat. No. 4,215,682 to Kubik et al. Alternatively, DC corona charging has been used as described in U.S. Pats. No. Re. 30,782; 31,285 and 32,171 to van Turnhout, and U.S. Pat. Nos. 4,375,718 and 5,401,446 to Wadsworth et al., U.S. Pat. No. 4,588,537 to Klasse et al., and U.S. Pat. No. 4,592,815 to Nakao. The polymeric articles also can be charged by contacting them with water or a polar liquid. Documents that describe charging through use of water—that is hydrocharging—include U.S. Pat. Nos. 5,496,507, 6119,691, 6,375,886, and 6,783,574 to Angadjivand et al., U.S. Pat. No. 6,406,657 to Eitzman et al., and U.S. Pat. No. 6,743,464 to Insley et al. Electret articles also can be charged by exposing them to polar liquids other than water as taught in U.S. Pat. No. 6,454,986 to Eitzman et al. Hydrocharging is a preferred method for imparting charge to the fibers because it uses a readily available material that is easy to handle and that is environmentally friendly. Hydrocharging also provides higher Q9 values when used in conjunction with the present invention. The charging process can be applied to one or more surfaces of the article.

Hydrocharging methods deposit both positive and negative charge onto the fibers such that the positive and negative charge is randomly dispersed throughout the web. Random charge dispersal tends to produce an unpolarized web. Thus, a nonwoven fibrous electret web produced by charging with a polar liquid like water may be substantially unpolarized in a plane normal to the plane of the web. Fibers that have been charged in this manner ideally exhibit the charge configuration shown in FIGS. 5C of U.S. Pat. No. 6,119,691 to Angadjivand et al. If the fibrous web also is subjected to a corona charging operation, it would exhibit a charge configuration similar to the configuration shown in FIG. 5B of that patent. A web, formed from fibers charged solely using hydrocharging, typically has unpolarized trapped charge throughout the volume of the web. "Substantially unpolarized trapped charge" refers to a fibrous electret web that exhibits less than 1 µC/m$^2$ of detectable discharge current using thermally-simulated discharge current (TSDC) analysis, where the denominator is the electrode surface area. This charge configuration can be shown by subjecting the web to TSDC. One example of a useful hydrocharging process includes impinging jets of water or a stream of water droplets onto the article at a pressure and for a period sufficient to impart a filtration enhancing electret charge to the web, and then drying the article—see U.S. Pat. No. 5,496,507 to Angadjivand et al. The pressure necessary to optimize the filtration enhancing electret charge imparted to the article will vary depending on the type of sprayer used, the type of polymer from which the article is formed, the type and concentration of additives to the polymer, and the thickness and density of the article. Pressures in the range of about 10 to about 500 psi (69 to 3450 kPa) are suitable. The jets of water or stream of water droplets can be provided by any suitable spray device. One example of a useful spray device is the apparatus used for hydraulically entangling fibers.

The fluorinated electrets formed by the methods described in this document are suitable for use as, e.g., electrostatic elements in electro-acoustic devices such as microphones, headphones and speakers, fluid filters, dust particle control devices in, e.g., high voltage electrostatic generators, electrostatic recorders, respirators (e.g., prefilters, canisters and replaceable cartridges), heating, ventilation, air conditioning, and face masks.

Method for Determining Surface Concentration of Fluorine Using X-ray Photoelectron Spectroscopy(XPS)

X-ray photoelectron spectroscopy (XPS) is a surface analysis technique that uses a beam of soft x-rays (Al Kα, 1486.6 eV) as a probe. The x-rays irradiate the material to generate photoelectrons that are characterized by their kinetic energy and intensity. The kinetic energies of the photoelectrons can provide quantitative information of the elements and their chemical states. XPS probes the outermost ~30 to 100 Å of a sample surface. It is sensitive to essentially all elements except hydrogen and helium, with detection limits down to approximately 0.1 atomic %.

XPS measurements were carried out on the sample materials using a Kratos Axis Ultra Spectrometer (Kratos Analytical, Manchester, England), which spectrometer was equipped with a monochromatic Al Kα x-ray excitation source and a spherical mirror analyzer. The spectrometer had an X-ray power equal to or near 168 Watts (W) (14 kV, 12 mA). The photoelectron take-off angle for all recorded spectra was 90 degrees, measured with respect to the sample surface. The Kratos system has a sampling area of approximately 800 micrometers (μm)×600 μm. The pressure in the vacuum system during analysis was at or below $7.0 \times 10^{-6}$ Pascals (Pa).

Using the XPS method, wide scan surveys were obtained from the sample materials. A wide scan survey spectrum contains photoelectron peaks that are characteristic of the elements present on the surface of the material. The surface composition (in atomic %) is derived from the relative areas of the core-level photoelectron peaks, with linear background subtraction and corrections to account for the instrument's atomic sensitivity factors. The Kratos spectrometer's performance was verified by analysis of a poly(tetrafluoroethylene) (PTFE) sample, which showed experimental values of atomic % fluorine (APF)=67 and atomic % carbon=33. These values are in excellent agreement with the PTFE theoretical stoichiometry.

Typical survey and carbon 1s instrumental settings that were used are given in Table 1 below:

TABLE 1

| Analysis | Pass Energy (eV) | Scan Length (eV) | eV/data point (eV) | Time/data point (ms) | Number of Sweeps |
|---|---|---|---|---|---|
| Survey | 160 | 0 to 1100 | 0.5 | 55 | 6 |

Method for Determining Saturated/Unsaturated Ratio Using ToF-SIMS:

Time-of-flight secondary ion mass spectrometry (ToF-SIMS) is a surface analysis technique in which a pulsed beam of kilovolt energy ions (primary ions) is used to bombard a specimen, resulting in sputtering of its surface. During sputtering, neutral and ionized atomic and molecular species are emitted from the surface. The ionized species are referred to as "secondary ions" to distinguish them from the bombarding primary ions. Secondary ions of one polarity are accelerated in an electric field to a mass spectrometer, where they travel through a flight tube and arrive at the detection and counting system. As a result of the fragments departing from the sample surface at the same time, and being subject to the same accelerating voltage, the lighter fragments arrive at the detection system before the heavier ones. The "time-of-flight" of a fragment is proportional to the square root of its mass, so that different masses are separated during the flight and can be detected individually. The quantity measured in the analysis is the fragment mass divided by the charge amount on the fragment (m/z).

ToF-SIMS analysis was performed on samples using a Physical Electronics Trift I instrument (Eden Prairie, Minn.), with a 15 kilovolt (keV) Ga$^+$ primary ion beam rastered over a 400 μm×400 μm sample target area. ToF-SIMS provides chemical information on the outermost 10 to 20 Å of a material and produces spectra of fluorocarbon ions in both the positive and negative ion modes, extending out to a mass of 1000 atomic mass units (u) and beyond. Analysis of negative ion spectra of $C_3F_8$-fluorinated webs showed that the fluorocarbon ions could be separated into distinct oligomeric series, ranging from completely saturated to highly unsaturated. The more prominent series are as follows:

$C_nF_{2n+1}^-$, where n=1, 2, . . . fully saturated series (examples: $C_4F_9^-$, $C_8F_{17}^-$)

$C_nF_{2n-1}^-$, where n=3, 4, . . . unsaturated series (examples: $C_4F_7^-$, $C_8F_{15}^-$)

$C_nF_{2n-3}^-$, where n=6, 7, . . . unsaturated series (examples: $C_7F_{11}^-$, $C_8F_{13}^-$)

$C_nF_{2n-5}^-$, where n=8, 9, . . . highly unsaturated series (examples: $C_8F_{11}^-$, $C_{10}F^-$)

Generally, these ion series each show an intensity distribution that tends to tail off at a higher mass. Unsaturated ion series are largely indicative of direct sample fluorination, while the unsaturated ion series above n=3 are indicative of a highly branched fluoropolymer coating deposited on the sample.

The saturated/unsaturated ratio (SUR) is calculated using the following equation:

$$SUR = C_s/C_u \text{ (dimensionless)}$$

Given:

$$C_s = \sum_{n=4}^{8} C_nF_{2n+1}$$

Saturated Ion Count $$C_u = \sum_{n=4}^{8} C_nF_{2n-1} + \sum_{n=6}^{9} C_nF_{2n-3} + \sum_{n=8}^{10} C_nF_{2n-5}$$

Unsaturated Ion Count

Values of "$C_xF_y$" are counts of ions for a given structure at the spectra locations specified in Table 2 below:

TABLE 2

| Ion Structure | Spectrum Nominal Mass (m/z) | Spectrum Lower Mass (m/z) | Spectrum Upper Mass (m/z) |
|---|---|---|---|
| $C_4F_9$ | 219 | 218.329 | 219.953 |
| $C_5F_{11}$ | 269 | 268.146 | 270.036 |
| $C_6F_{13}$ | 319 | 318.218 | 319.981 |
| $C_7F_{15}$ | 369 | 368.174 | 369.953 |
| $C_8F_{17}$ | 419 | 418.146 | 419.942 |
| $C_4F_7$ | 181 | 180.356 | 181.87 |
| $C_5F_9$ | 231 | 230.312 | 231.843 |
| $C_6F_{11}$ | 281 | 280.191 | 281.887 |
| $C_7F_{13}$ | 331 | 330.218 | 331.87 |
| $C_8F_{15}$ | 381 | 380.312 | 381.887 |
| $C_6F_9$ | 243 | 242.191 | 243.887 |
| $C_7F_{11}$ | 293 | 292.174 | 293.942 |
| $C_8F_{13}$ | 343 | 342.202 | 343.925 |
| $C_9F_{15}$ | 393 | 392.174 | 393.942 |
| $C_8F_{11}$ | 305 | 304.163 | 305.914 |
| $C_9F_{13}$ | 355 | 354.191 | 355.87 |
| $C_{10}F_{15}$ | 405 | 404.229 | 405.831 |

Figure 5:
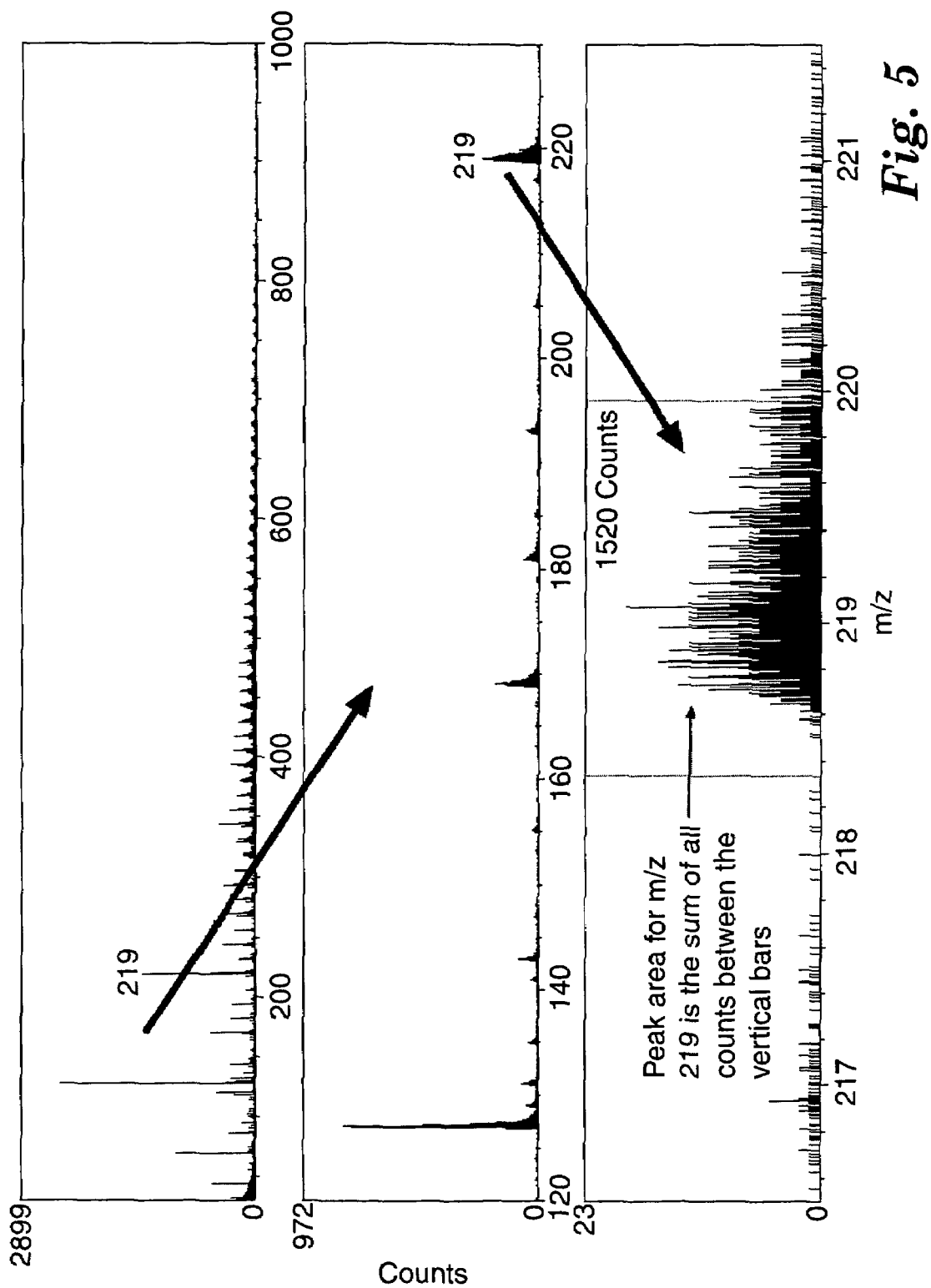
FIG. 5 is an illustration of ToF-SIMS spectrum for a fluorinated BMF web that highlights a $C_4F_9^-$ species.

As an illustration of the spectra type, FIG. 5 shows a ToF-SIMS spectrum for a fluorinated polypropylene blown microfiber (BMF), more specifically, the spectrum record for a $C_4F_9^-$ ion species. The plots progressively provide a magnification that centers around the $C_4F_9^-$ ion at a m/z of 219. As is indicated in the bottom plot, the ion count for the $C_4F_9^-$ species in the defined range between m/z 218.329 and m/z 219.953, was 1520. This would be the count value used in the calculation of the saturated/unsaturated ratio (SUR). In this manner counts for saturated and unsaturated species were made for input to the SUR calculation for a given Example.

Fluorosaturation Ratio

The fluorosaturation ratio (FSR) is a calculated value determined by dividing the atomic % fluorine (APF) of a sample by its saturated/unsaturated ratio (SUR) and is given as:

$$FSR = \frac{APF}{SUR}$$

Thermally Stimulated Discharge Current (TSDC)

Thermally Stimulated Discharge Current (TSDC) studies were conducted using a Solomat TSC/RMA model 91000 with a pivot electrode, available from TherMold Partners, L. P., Thermal Analysis Instruments of Stamford, Conn. Test samples were prepared by first exposing them to a DC corona charge to polarize the previously substantially unpolarized trapped charge. DC corona charging was carried out under ambient conditions using a horizontally arranged series of four charging bars (obtained under the trade designation "CHARGEMASTER PINNER ARC RESISTANT CHARGING BAR" from Simco Company, Hatfield, Pa.). Charging bars were spaced with a center-to-center distance between bars 1 and 2, 2 and 3, and 3 and 4 of 7.6 cm, 8.3 cm, and 9.5 cm respectively. Each charging bar was situated 3.5 cm above a corresponding grounded metal plate. A voltage of +29 kilovolts (relative to the grounded metal plates) was applied to each charging bar. Samples were charged by placing them on a moving (2.54 cm/sec) continuous belt (part number 8882802A, obtained from Light Weight Belting Corporation, Minneapolis, Minn.) that passed between the charging bars and the metal plates, such that the belt maintained contact with the metal plates.

To determine the TSDC, corona treated web samples were placed between electrodes in the Solomat TSC/RMA test instrument. In the Solomat instrument, a thermometer was disposed adjacent to, but not touching, the sample to record the temperature at discharge. The web samples were optically dense, that is, there were no visible holes through the sample web. Samples were also large enough to completely cover the top contact electrode of the Solomat instrument. To ensure good electrical contact to the electrodes, the web samples were compressed in thickness by about a factor of 10. With the sample fixtured in the instrument, air was purged from the sample chamber using helium at a pressure of about 110 kPa. Liquid nitrogen cooling was used to cool the chamber to a temperature of about 5° C.

During the test procedure a sample was held at 5° C. for 5 minutes with the field off and then heated at 5° C./min while the discharge current was measured. Charge densities can be calculated from each TSDC spectrum peak by drawing a baseline between the minima on each side of a selected peak and integrating the area under the peak. The peak maximum is defined as the temperature at which the discharge current obtains a maximum value.

Thermal Stability Quality Factor (Q9)

Thermal stability Quality Factor (Q9) was determined for a test sample by first conditioning the sample in an oven for nine hours at 100° C. The conditioned sample was allowed to cool and was tested for particle penetration. Q9 is a calculated value that is based on the measure of the particle penetration of small particles of dioctyl phthalate (DOP) as they are filtered through the test sample. Particle penetration was determined using a CertiTest, automated filter tester, from TSI, Inc., St. Paul, Minn. Flow rate of the instrument was set at 42.5 liter/minute (L/min), which corresponded to a face velocity of 6.9 centimeters per second (cm/sec). The particle neutralizer of the system was turned off. Pressure drop across the sample was measured at the challenge face velocity of 6.9 cm/sec using an electronic manometer. Pressure drop was reported in millimeters of water (mm $H_2O$). DOP penetration and pressure drop are used to calculate Q9 from the natural log (1 n) of the DOP penetration under the following formula:

$$Q9[1/mm\ H_2O] = \frac{-\ln\left(\frac{DOPPenetration(\%)}{100\%}\right)}{PressureDrop[mm\ H_2O]}$$

A higher Q9 value indicates better filtration performance after heat conditioning. A lower Q9 effectively correlates with decreased filtration performance upon heat exposure.

Effective Fiber Diameter

The average Effective Fiber Diameter (EFD) of a web sample in micrometers was calculated using equation number 12 and an air flow rate of 32 L/min according to the method described in Davies, C. N., *The Separation of Airborne Dust and Particles*, Institution of Mechanical Engineers, London, *Proceedings* 1B, 1952.

Web Solidity

Web solidity was determined by dividing the bulk density of a web by the density of the materials making up the web. Bulk density is the basis weight of a web (ratio of web weight to its surface area) divided by its thickness. Bulk density of a web was determined by measuring the weight and thickness of a known area of web. Thickness of the web was determined by placing a web sample on a flat support and then lowering a plate (9.81 cm diameter, 230 g) onto the sample at a loading pressure of 298 Pascals. With the sample loaded, the distance between the plate and flat support were measured. Dividing the web sample weight by the sample area gave the basis weight (BW) of the specimen, which is reported in grams per square centimeter (g/cm$^2$). The bulk density was determined by dividing the web basis weight by its thickness and was reported in grams per cubic centimeter (g/cm$^3$). Web solidity (S) was determined by dividing the web bulk density by the density of the material from which the web was produced. The density of the polymer or polymer components can be measured by standard means if the supplier does not specify material density. Solidity (S) is reported as a dimensionless fraction of the percent solids content of a given specimen and is calculated as follows:

$$S = \frac{\rho_{web}}{\rho_{material}} \times 100\%$$

Heteroatom Determination

Heteroatom presence in the surface of a material was determined by using ToF-SIMS. The quantity of the heteroatom, relative to other atomic species, was determined by taking the ratio of integrated counts for the heteroatom ions against the total counts in the spectrum. Table 3 lists the heteroatom species that were used to determine heteroatom incorporation in the examples:

TABLE 3

| Heteroatom | Ion Structure | Spectrum Peak Position (m/z) |
|---|---|---|
| S | $SF_3^-$ | 89 |
| S | $SF_5^-$ | 127 |
| N | $CF_2N^-$ | 64 |
| N | $CF_4N^-$ | 102 |
| N | $C_2F_4N^-$ | 114 |
| N | $C_2F_6N^-$ | 152 |
| N | $C_3F_6N^-$ | 164 |
| N | $C_3F_8N^-$ | 202 |
| N | $C_4F_8N^-$ | 214 |
| B | $^{10}B^+$ | 10 |
| B | $^{11}B^+$ (boron isotopes) | 11 |
| Si | $^{28}Si^+$ | 28 |
| Si | $^{29}Si^+$ | 29 |
| Si | $^{30}Si^+$ (silicon isotopes) | 30 |

Typically heteroatoms include nitrogen, sulfur, phosphorus, silicon and boron. Heteroatom content significant to cause the benefits described in the invention are those above a detectable background level. Background values of heteroatoms, as determined by the ToF-SIMS Heteroatom Ratio, are given in Table 4. Heteroatoms must be above the "background value" to be considered beneficial. In general, background values can be as great as 0.001, but due to the prevalence of nitrogen in the atmosphere, the nitrogen background value is significantly greater that those of other heteroatoms considered.

TABLE 4

| Ion | Background Value |
|---|---|
| Boron (+) ion | 0.0003 |
| Silicon (+) ion | 0.0007 |
| Sulfur (−) ion | 0.0006 |
| Nitrogen (−) ion | 0.0040 |

EXAMPLES

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

General Web Making, Plasma Treatment, and Electret Charging Procedures

Blown microfiber (BMF) webs used in the examples were prepared from polypropylene (Fina EOD 97-13 polypropylene resin available from FINA Oil and Chemical Co., Houston, Tex.) and had effective fiber diameters of approximately 7.5 µm, a basis weight of 62 g/m$^2$, and a web solidity of 6%. Webs were prepared as generally described in Wente, Van A., *Superfine Thermoplastic Fibers*, INDUSTRIAL ENG. CHEMISTRY, Vol. 48, pp. 1342-1346.

BMF webs were plasma treated using a web conveying process for a specified time, with AC plasma in a vacuum chamber that was filled with 24.7 Pa of fluorine containing species gas at a specified total plasma energy and power of 2250 watts. The molecule residence time in the treatment chamber was estimated to be about 120 seconds for a pressure of 67 Pa and a flow of 0.024 standard cubic centimeters per minute per square centimeter of sample area. The pumping rate was controlled to achieve the desired working pressure in the chamber. A web conveying system moved the specimen through the gap between a set of drum electrodes that had a configuration such that both sides of the substrate were subjected to the plasma. Each side was treated for an equal duration. The drum electrodes consisted of a 6061-aluminum drum surrounded by a concentric 6061-aluminum plate that formed a gap through which the substrate was run. Power was applied using a RF generator (13.56 MHz) coupled through an automatic matching network (RF-50 and AMN-20-K, RF Plasma Products, Inc., Voorhees N.J.) in order to sustain the plasma. Both sets of electrodes were cooled to 23° C. using recirculating water.

After plasma treatment, webs were electret-charged in a manner generally described in U.S. Pat. No. 5,496,507, to Angadjivand, et al. Webs were charged by moving past spray heads that delivered deionized water, with a resistivity of about 6×10$^6$ ohm-cm, to one face of the web while a vacuum was applied to the opposite face of the web. Water was delivered to the webs using Teejet Model 95015 spray heads available from Spraying Systems, Wheaton, Ill. Spray heads were placed 10 cm apart and 10.5 cm away from the webs and operated at a pressure of 689 kPa. Water was sprayed at a rate of about 0.87 liters of water per square meter of web. Webs passed the spray heads at a rate of 15 cm/sec with a vacuum of 8.7 kPa below atmospheric, applied to a slot about 0.6 cm wide, positioned opposite the spray heads under the open mesh carrier belt. Both sides of the web were treated in this manner.

Example 1

A BMF web as described in the "General Web Making and Treatment" section was prepared using a two-stage fluorination procedure. In the first stage of the fluorination procedure, the web was exposed to a $C_3F_8$ plasma for 75 seconds and then to a second exposure of 75 seconds to a $SF_6$ plasma. Sample preparation conditions—including fluorine containing species gas, volumetric blend ratio of the of the species gas, exposure time, and total plasma energy—are given in Table 6 with corresponding values for the resulting atomic % fluorine (APF), saturated/unsaturated ratio (SUR), fluorosaturation ratio (FSR), and the thermal stability quality factor (Q9) given in Table 7. Heteroatom presence on the surface of the sample is also indicated in Table 8.

Example 2

A BMF web as described in the "General Web Making and Treatment" section was prepared using blended $C_3F_8$/$NF_3$ plasma. The gas used in the blend of Example was a 50%/50% (by volume) blend of $C_3F_8$/$NF_3$ at STP. Sample preparation conditions—including fluorine containing species gas, volumetric blend ratio of the of the species gas, exposure time, and total plasma energy—are given in Table 6 with corresponding values for the resulting atomic % fluorine (APF), saturated/unsaturated ratio (SUR), fluorosaturation ratio (FSR), and the thermal stability quality factor (Q9) given in Table 7. Heteroatom presence on the surface of the sample is also indicated in Table 8.

Examples 3,4,5,6,7,8,9,10,11,12,13, and 14

BMF webs as described in the "General Web Making and Treatment" section were prepared using blended gas plasmas as in Example 2 except that the plasma gas mixtures differed in composition. Sample preparation conditions—including fluorine containing species gas, volumetric blend ratio of the of the species gas, exposure time, and total plasma energy—are given in Table 6 with corresponding values for the resulting atomic % fluorine (APF), saturated/unsaturated ratio (SUR), fluorosaturation ratio (FSR), and the thermal stability quality factor (Q9) given in Table 7. Heteroatom presence on the surface of the sample is also indicated in Table 8.

Comparative Examples 1c, 2c, 3c, 4c, 5c, 6c, 7c, 8c, and 9c

BMF webs as described in the "General Web Making and Treatment" section were prepared using various gaseous fluorine containing species. Sample preparation conditions—including fluorine containing species gas, volumetric blend ratio of the of the species gas, exposure time, and total plasma energy—are given in Table 6 with corresponding values for the resulting atomic % fluorine (APF), saturated/unsaturated ratio (SUR), fluorosaturation ratio (FSR), the thermal stability quality factor (Q9), and TSDC data given in Table 7. Heteroatom presence on the surface of the sample is also indicated in Table 8.

Comparative Examples 10c, 11c, 12c, and 13c

Comparative Examples 10c through 13c were drawn directly from U.S. Pat. No. 6,397,548 (Jones et al) with the examples of the patent relating to the comparative examples illustrated in Table 5. All of these webs were fluorinated at atmospheric pressure with the quoted concentration of Fluorine containing gas diluted in pure helium. Sample preparation conditions including fluorine containing species gas, exposure time, and total plasma energy are given in Table 6. Values for the resulting atomic % fluorine (APF), saturated/unsaturated ratio (SUR), fluorosaturation ratio (FSR), the thermal stability quality factor (Q9), and TSDC data where applicable are given in Table 7. Heteroatom presence on the surface of the sample is also indicated in Table 8. The abbreviation "NA" in the Tables means that the information is not available.

TABLE 5

| Comparative Example | Description | U.S. Pat. No. 6,397,548 Example |
|---|---|---|
| 10c | 1% $CF_4$ Corona Fluorination | 6 |
| 11c | 1% $C_2F_6$ Corona Fluorination | 1 |
| 12c | 0.1% $C_3F_6$ Corona Fluorination | 27 |
| 13c | 0.1% $C_5F_{12}$ Corona Fluorination | 8 |

TABLE 6

| Example | Fluorine Species | Fluorine Species Blend Ratio ($\%_{vol}/\%_{vol}$) | Exposure Time (seconds) | Total Plasma Energy (J/cm$^2$) |
|---|---|---|---|---|
| 1 | $C_3F_8$ + $SF_6$ | Sequential | 75 (each pass) | 9 |
| 2 | $C_3F_8$/$NF_3$ | 50/50 | 75 | 9.0 |
| 3 | $C_3F_8$/$NF_3$ | 33/66 | 120 | 14.4 |
| 4 | $C_2F_6$/$NF_3$ | 33/66 | 120 | 14.4 |
| 5 | $CF_4$/$NF_3$ | 33/66 | 120 | 14.4 |
| 6 | HFPO/$NF_3$ | 33/66 | 120 | 14.4 |
| 7 | OFTHF/$NF_3$ | 33/66 | 120 | 14.4 |
| 8 | OFTHF/$NF_3$ | 50/50 | 120 | 14.4 |
| 9 | $CF_4$/$NF_3$ | 50/50 | 120 | 14.4 |
| 10 | HFPO/$NF_3$ | 50/50 | 120 | 14.4 |
| 11 | $C_3F_8$/$N_2$ | 50/50 | 120 | 14.4 |
| 12 | $C_3F_8$/$N_2$ | 90/10 | 120 | 14.4 |
| 13 | $SiF_4$/$C_3F_8$ | 50/50 | 120 | 14.4 |
| 14 | $BF_3$/$C_3F_8$ | 50/50 | 120 | 14.4 |
| 1c | $C_3F_8$ | 100 | 120 | 14.4 |
| 2c | $C_3F_8$ | 100 | 75 | 9.0 |
| 3c | $C_3F_8$ | 100 | 20 | 2.4 |
| 4c | $SF_6$ | 100 | 20 | 2.4 |
| 5c | $NF_3$ | 100 | 20 | 2.4 |
| 6c | $CF_4$ | 100 | 75 | 9.0 |
| 7c | $CF_4$ | 100 | 20 | 2.4 |
| 8c | $SiF_4$ | 100 | 120 | 14.4 |
| 9c | $BF_3$ | 100 | 120 | 14.4 |
| 10c | $CF_4$ | NA | NA | NA |
| 11c | $C_2F_6$ | NA | NA | NA |
| 12c | HFP | NA | NA | NA |
| 13c | $C_5F_{12}$ | NA | NA | NA |

TABLE 7

| Example | SUR (unitless) | APF (%) | FSR (unitless) | Q9 (1/mm H$_2$O) | TSDC (° C.) |
|---|---|---|---|---|---|
| 1 | 0.59 | 62 | 105 | 1.81 | NA |
| 2 | 0.76 | 54 | 71 | 2.09 | NA |
| 3 | 0.43 | 52 | 121 | 1.72 | 147 |
| 4 | 0.30 | 51 | 168 | 1.78 | NA |
| 5 | 0.28 | 51 | 179 | 1.65 | NA |
| 6 | 0.35 | 50 | 144 | 1.74 | NA |
| 7 | 0.55 | 52 | 95 | 1.70 | NA |
| 8 | 0.86 | 55 | 64 | 1.61 | NA |
| 9 | 0.33 | 45 | 136 | 1.63 | NA |
| 10 | 0.55 | 52 | 94 | 1.82 | NA |
| 11 | 1.27 | 55 | 43 | 1.75 | NA |
| 12 | 1.69 | 60 | 35 | 1.42 | NA |
| 13 | 0.78 | 58 | 74 | 1.87 | NA |
| 14 | 0.70 | 56 | 80 | 1.55 | NA |
| 1c | 1.37 | 56 | 41 | 1.36 | 124 |
| 2c | 1.14 | 55 | 48 | 1.25 | NA |
| 3c | 1.08 | 43 | 40 | 0.82 | NA |
| 4c | 0.34 | 37 | 109 | 1.00 | NA |
| 5c | 0.68 | 37 | 54 | 0.78 | NA |
| 6c | 0.34 | 35 | 103 | 1.47 | 122 |
| 7c | 0.49 | 21 | 43 | 1.17 | NA |
| 8c | 0.59 | 7.9 | 13 | 0.22 | NA |
| 9c | 1.69 | 1.1 | 1 | 0.47 | NA |
| 10c | 0.50 | 53 | 106 | NA | NA |

TABLE 7-continued

| Example | SUR (unitless) | APF (%) | FSR (unitless) | Q9 (1/mm H₂O) | TSDC (° C.) |
|---|---|---|---|---|---|
| 11c | 1.39 | 56 | 40 | NA | NA |
| 12c | 0.75 | 58 | 77 | NA | NA |
| 13c | 2.01 | 58 | 29 | NA | NA |

TABLE 8

| | ToF-SIMS Heteroatom Ratio | | | |
|---|---|---|---|---|
| Example | S | N | B | Si |
| 1 | 0.0070 | 0.0000 | 0.0000 | 0.0000 |
| 2 | 0.0003 | 0.0719 | 0.0001 | 0.0001 |
| 3 | 0.0000 | 0.0570 | 0.0000 | 0.0000 |
| 4 | 0.0000 | 0.0380 | 0.0000 | 0.0000 |
| 5 | 0.0000 | 0.0300 | 0.0000 | 0.0000 |
| 6 | 0.0000 | 0.0260 | 0.0000 | 0.0000 |
| 7 | 0.0000 | 0.0530 | 0.0000 | 0.0000 |
| 8 | 0.0000 | 0.0300 | 0.0000 | 0.0000 |
| 9 | 0.0000 | 0.0220 | 0.0000 | 0.0000 |
| 10 | 0.0000 | 0.0420 | 0.0000 | 0.0000 |
| 11 | 0.0000 | 0.0230 | 0.0000 | 0.0000 |
| 12 | 0.0000 | 0.0060 | 0.0000 | 0.0000 |
| 13 | 0.0000 | 0.0010 | 0.0000 | 0.0020 |
| 14 | 0.0000 | 0.0010 | 0.0010 | 0.0000 |
| 1c | 0.0000 | 0.0000 | 0.0000 | 0.0000 |
| 2c | 0.0000 | 0.0000 | 0.0000 | 0.0000 |
| 3c | 0.0000 | 0.0000 | 0.0000 | 0.0000 |
| 4c | 0.0180 | 0.0000 | 0.0000 | 0.0000 |
| 5c | 0.0000 | 0.0040 | 0.0000 | 0.0000 |
| 6c | 0.0000 | 0.0000 | 0.0000 | 0.0000 |
| 7c | 0.0000 | 0.0000 | 0.0000 | 0.0000 |
| 8c | 0.0000 | 0.0010 | 0.0050 | 0.2210 |
| 9c | 0.0000 | 0.0000 | 0.0460 | 0.0060 |
| 10c | 0.0004 | 0.0033 | 0.0000 | 0.0001 |
| 11c | 0.0003 | 0.0021 | 0.0001 | 0.0002 |
| 12c | 0.0002 | 0.0005 | 0.0000 | 0.0000 |
| 13c | 0.0002 | 0.0010 | 0.0000 | 0.0000 |

As is evident from the Q9 filtration results given in Table 7, fluorinated filter webs of the invention achieve a significant thermally stable filtration improvement.

An application that also describes a method for achieving a thermally stable electret article is the application entitled *Electret Article Having High Fluorosaturation Ratio*, filed on the same day as this application (attorney case number 59337US002).

This invention may take on various modifications and alterations without departing from its spirit and scope. Accordingly, this invention is not limited to the above-described but is controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. An electret article that comprises:
   a polymeric material that has electric charge imparted thereto, that includes one or more types of heteroatoms, that has a fluorosaturation ratio of about 200 or less, and that has an atomic percent fluorine of about 40% or greater.

2. The electret article of claim 1, wherein the polymeric material is nonconductive, and wherein the electret article exhibits persistent electret charge.

3. The electret article of claim 2, wherein the polymeric material is in the form of a nonwoven web of fibers.

4. The electret article of claim 3, wherein the fibers are microfibers.

5. The electret article of claim 4, wherein the fibers are melt-blown microfibers.

6. The electret article of claim 4, wherein the microfibers have an effective fiber diameter of about 1 to 20 micrometers.

7. The electret article of claim 1, wherein the polymeric material is nonconductive, wherein the electret article exhibits persistent electret charge, and wherein the fibers are spun bond fibers.

8. The electret article of claim 1, wherein the polymeric material exhibits a volume resistivity of about $10^{16}$ ohm·cm or greater.

9. The electret article of claim 3, wherein the nonwoven web has a basis weight of about 2 to 500 g/m².

10. The electret article of claim 9, wherein the nonwoven web has a basis weight of about 20 to 150 g/m².

11. The electret article of claim 3, wherein the nonwoven web has a thickness of about 0.25 to 20 mm.

12. The electret article of claim 11, wherein the nonwoven web has a thickness of about 0.5 to 2 mm.

13. The electret article of claim 3, further comprising multiple layers of nonwoven webs of fibers.

14. The electret article of claim 3, wherein the nonwoven web of fibers has a solidity of about 1 to 25.

15. The electret article of claim 3, wherein the nonwoven web of fibers has a solidity of about 3 to 10.

16. A filtering face mask that comprises a filter material that includes the electret article of claim 3.

17. The filtering face mask of claim 16, wherein the mask includes a mask body that is adapted to fit over the nose and mouth of a wearer, and wherein the electret filter media is disposed in the mask body.

18. A filter cartridge that comprises a filter media that includes the electret article of claim 3.

19. A respirator that comprises a mask body and at least one filter cartridge of claim 18.

20. A filtration media array that comprises multiple flow channels that have opposing inlets and outlets, the electret article of claim 2 defining the multiple flow channels.

21. The electret article of claim 3, exhibiting a Q9 value of at least 1.5 per mm H₂O.

22. The electret article of claim 3, exhibiting a Q9 value of at least 1.7 per mm H₂O.

23. The electret article of claim 3, exhibiting a Q9 value of at least 2.0 per mm H₂O.

24. The electret article of claim 2, exhibiting about 40 to 65 atomic percent fluorine when analyzed by XPS.

25. The electret article of claim 2, having a fluorosaturation ratio of less than about 180.

26. The electret article of claim 2, exhibiting a fluorosaturation ratio of less than about 120.

27. The electret article of claim 25, wherein the fluorosaturation ratio is greater than 30.

28. The electret article of claim 26, wherein the fluorosaturation ratio is greater than 35.

29. The electret article of claim 2, wherein the heteroatoms are selected from the group consisting of sulfur, nitrogen, boron, silicon, and combinations thereof.

30. The electret article of claim 2, wherein the polymeric material includes nitrogen as a heteroatom.

31. The electret article of claim 30, wherein the nitrogen is present in the electret article at about 100% above the background value.

32. The electret article of claim 29, wherein the heteroatoms are present in the electret article at about 100% above the background value.

33. The electret article of claim 29, wherein the heteroatoms are present in the electret article at about 500% above the background value.

34. The electret article of claim 29, wherein the heteroatoms are present in the electret article at about 1,000% above the background value.

35. The electret article of claim 2, wherein the heteroatoms are present in the article at about 100% above the background value.

36. The electret article of claim 2, wherein the electric charge has been imparted thereto by at least hydrocharging.

* * * * *

UNITED STATES PATENT AND TRADEMARK OFFICE
CERTIFICATE OF CORRECTION

PATENT NO. : 7,244,292 B2
APPLICATION NO. : 11/120049
DATED : July 17, 2007
INVENTOR(S) : Seth M. Kirk It is certified that error appears in the above-identified patent and that said Letters Patent is hereby corrected as shown below:

Column 12
Line 37, delete "$C_{10}F^-$)" and insert -- $C_{10}F_{15}^-$) -- therefor.

Column 14
Line 37, delete "(1 n)" and insert -- (ln) -- therefor.

Line 53, delete "*ofAirborne*" and insert -- *of Airborne* -- therefore.

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,244,292 B2
APPLICATION NO. : 11/120049
DATED : July 17, 2007
INVENTOR(S) : Seth M. Kirk It is certified that error appears in the above-identified patent and that said Letters Patent is hereby corrected as shown below:

<u>Column 12</u>
Line 37, delete "$C_{10}F^-$)" and insert -- $C_{10}F_{15}^-$) -- therefor.

<u>Column 14</u>
Line 37, delete "(1 n)" and insert -- (ln) -- therefor.

Line 53, delete "*ofAirborne*" and insert -- *of Airborne* -- therefore.

Signed and Sealed this

Twenty-third Day of October, 2007

JON W. DUDAS
*Director of the United States Patent and Trademark Office*